United States Patent [19]

Sugimoto et al.

[11] 4,423,900

[45] Jan. 3, 1984

[54] TIRE-STORAGE ARRANGEMENT OF AUTOMOTIVE VEHICLE

[75] Inventors: Yōji Sugimoto; Hirotaka Tomioka, both of Yokohama, Japan

[73] Assignee: Nissan Motor Company, Limited, Yokohama, Japan

[21] Appl. No.: 367,629

[22] Filed: Apr. 12, 1982

[30] Foreign Application Priority Data

Apr. 15, 1981 [JP] Japan .................................. 56-55478

[51] Int. Cl.³ ............................................. B62D 43/10
[52] U.S. Cl. ................................ 296/37.14; 296/37.2; 296/37.16; 224/42.12; 224/42.2
[58] Field of Search ................. 296/37.14, 37.2, 37.16; 224/42.12, 42.2

[56] References Cited

U.S. PATENT DOCUMENTS

| | | | |
|---|---|---|---|
| 2,471,730 | 5/1949 | Doerr | 296/37.14 |
| 2,518,342 | 8/1950 | Lim | 296/37.2 |
| 2,660,348 | 11/1953 | Muller | 224/42.14 |
| 3,642,296 | 2/1972 | Froumajon | 296/37.2 |

Primary Examiner—Robert R. Song
Attorney, Agent, or Firm—Lane, Aitken & Kananen

[57] ABSTRACT

A spare-tire storage arrangement of an automotive vehicle, comprising a tire-storage pan portion forming part of the floor panel structure of the vehicle body and downwardly sunk from the upper face of the floor panel structure, the tire-storage pan portion having a bottom wall and a side wall and being formed with a concavity which is open upwardly and which is surrounded by the side wall, the tire-storage pan portion being internally sized to be suitable for having a regular-sized spare tire received on the inner surface of the side wall at least at a plurality of points of the outer perimeter of the tread portion of the tire; a receptacle member externally sized to fit the inner surface of the side wall of the tire-storage pan portion, the receptacle member having an upper face located above the upper face of the bottom wall of the tire-storage pan portion at a level equal to the difference between the depth of the concavity in the tire-storage pan portion and the width of a temporary-use spare tire.

9 Claims, 9 Drawing Figures

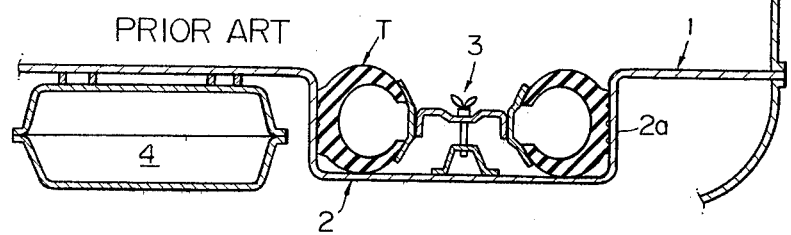
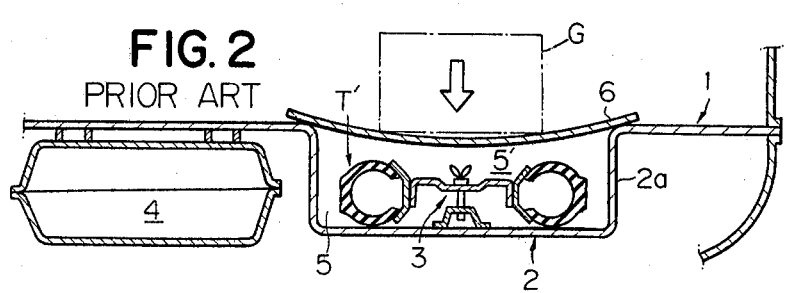
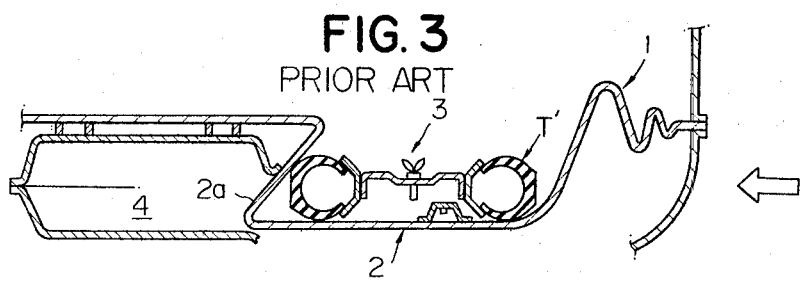

TIRE-STORAGE ARRANGEMENT OF AUTOMOTIVE VEHICLE

FIELD OF THE INVENTION

The present invention relates to a tire-storage arrangement of an automotive vehicle.

SUMMARY OF THE INVENTION

In accordance with the present invention, there is provided a spare-tire storage arrangement of an automotive vehicle having a vehicle body including a floor panel structure having a substantially horizontal upper face, comprising a tire-storage pan portion forming part of the floor panel structure and downwardly sunk from the horizontal upper face of the floor panel structure, the tire-storage pan portion having a bottom wall and a side wall and being formed with a concavity which is open upwardly and which is surrounded by the side wall, the tire-storage pan portion being internally sized to be suitable for having a regular-sized spare tire snugly received on the inner surface of the side wall at least at a plurality of points of the outer perimeter of the tread portion of the tire; a receptacle member externally sized to fit the inner surface of the side wall of the tire-storage pan portion, the receptacle member having an upper face located above the upper face of the bottom wall of the tire-storage pan portion at a level equal to the difference between the depth of the concavity in the tire-storage pan portion and the width of a temporary-use spare tire; and clamping means for having a temporary-use spare tire securely yet detachably attached to the upper face of the receptacle member.

BRIEF DESCRIPTION OF THE DRAWINGS

The features and advantages of a tire-storage arrangement according to the present invention will be more clearly appreciated from the following description taken in conjunction with the accompanying drawings in which like reference numerals designate corresponding or similar structures, units, members and elements and in which:

FIG. 1 is a sectional view showing a representative example of a prior-art tire-storage arrangement of the nature to which the present invention generally appertains;

FIG. 2 is a view similar to FIG. 1 but shows another example of a prior-art tire-storage arrangement used for the storage of a temporary-use tire on an automotive vehicle;

FIG. 3 is a view similar to FIG. 2 but shows a condition of the tire-storage arrangement upon a collision encountered by the vehicle;

DESCRIPTION OF THE PRIOR ART

Figure 4:
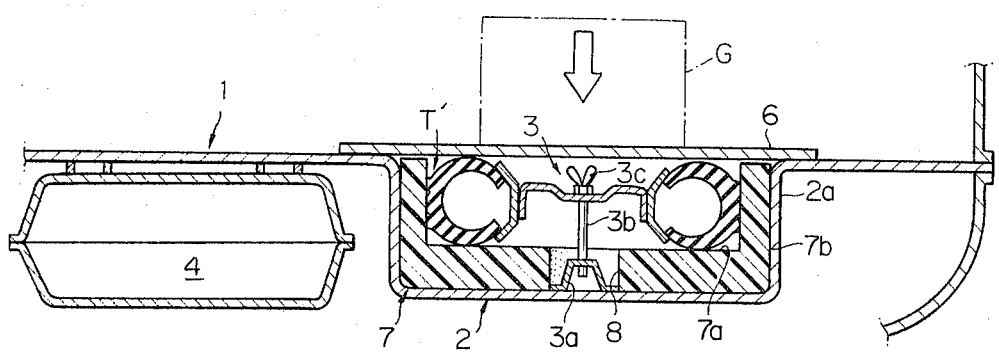
FIG. 4 is a sectional view showing a first preferred embodiment of a tire-storage arrangement according to the present invention.

Automotive vehicles are known which are of the type in which spare tires are stored internally of the body structures of the vehicles. FIG. 1 shows a representative example of the prior-art spare-tire storage arrangement in such an automotive vehicle. In the spare-tire storage arrangement herein shown, the vehicle body has a floor panel structure 1 formed with a generally barrel-shaped, tire-storage pan portion 2 which is usually located below the rear luggage compartment of the vehicle body. In order to have an ample space left available over the tire-storage pan portion 2 thus formed, the tire-storage pan portion 2 is downwardly sunk from the upper horizontal plane of the floor panel structure 1. A spare tire T is housed within this tire-storage pan portion 2 and is releasably fixed to the bottom wall of the tire-storage pan portion 2 by suitable clamping means 3 when the tire is not in use. The automotive vehicle having such a spare-tire storage arrangement may further have a fuel storage tank 4 fixedly attached to the underside of the floor panel structure 1 for the purpose of alleviating the strict space requirement of the vehicle and to prevent leakage of fuel into the vehicle body in the event of, for example, an accident. The fuel storage tank 4 thus supported by the floor panel structure 1 is usually located in front of the tire-storage pan portion 2.

In the meantime, the recent research and development efforts made by tire manufacturers have marked significant improvements in pneumatic tires for automotive use. As a result of such improvements, the spare tires stored on automotive vehicles now see seldom chances of being put to use during cruising of the vehicles, as well known by the uses of vehicles. It is, therefore, widely recognized at present that a spare tire T loaded on a vehicle suffices merely for temporary use in the event of an accident. For this reason and further from the view point of saving the costs and materials for spare tires, there is a growing trend to have small-sized temporary-use spare tires stored on vehicles in lieu of the tires of regular or ordinary sizes. FIG. 2 of the drawings shows a conventional spare-tire storage arrangement used for the storage of such a temporary-use spare tire T'.

If the tire-storage pan portion 2 of the floor panel structure 1 thus used for the storage of a temporary-use spare tire T' is designed to be suitable for the accommodation of such a tire, the temporary-use spare tire T' housed in the tire-storage pan portion 2 is compactly stored in the pan portion 2 so that only a slight annular gap is formed between the spare tire T' and the side wall 2a of the tire-storage pan portion 2. If the vehicle having the temporary-use spare tire T' stored in such a condition in the tire-storage pan portion 2 encounters a forward collision at the rear end thereof, the spare tire T' will act as a shock absorber which lends itself to preventing the pan portion 2 from causing damages to the fuel storage tank 4, which is therefore protected from causing leakage of fuel therefrom. If, furthermore, it happens that the tire-storage pan portion 2 of the floor panel structure 1 is left unoccupied by a spare tire T', the pan portion 2 is per se effective to take up the energy of the impact caused by a collision encountered by the vehicle so that the fuel storage tank 4 can also be protected from injury.

If, however, the tire-storage pan portion 2 of the floor panel structure 1 used for the storage of a temporary-use spare tire T' is originally sized to be suitable for having accommodated therein a spare tire T of the regular size, the temporary-use spare tire T' housed therein is radially spaced apart inwardly from the side wall 2a of the pan portion 2. In this instance, a considerable annular gap is formed horizontally between the side wall 2a of the tire-storage pan portion 2 and the outer perimeter of the tread portion of the spare tire T' housed in the pan portion 2 as indicated at 5 in FIG. 2. If the vehicle having the temporary-use spare tire T' stored in this fashion in the tire-storage pan portion 2 of the floor panel structure 1 encounters a forward collision at the rear end thereof as indicated by the arrow in FIG. 3, the spare tire T' is forcefully urged forwardly with respect to the pan portion 2. If the impact transmitted to the spare tire T' in such an occasion is of a serious degree, the spare tire T' initially spaced apart from the side wall 2a of the tire-storage pan portion 2 would be caused to fling forwardly in the pan portion 2 and to violently strike against a front portion of the side wall 2a of the pan portion 2 with the clamping means 3 destroyed as shown in FIG. 3. This may result in deformation of the tire-storage pan portion 2 of the floor panel structure 1 toward the fuel storage tank 4 and might force the pan portion 2 to strike against the fuel storage tank 4, causing damage to the fuel storage tank 4. The damage of the fuel storage tank 4 in turn might cause leakage of fuel therefrom and, in the worst case, firing of the fuel storage tank 4, endangering the vehicle occupants' lives. Thus, the tire-storage pan portion 2 will act as a shock absorber which lends itself to preventing the pan portion 2 from causing damages to the fuel storage tank 4, which is therefore protected from causing leakage of fuel therefrom.

In a conventional spare-tire storage arrangement constituted by the tire-storage pan portion 2 of the floor panel structure 1, furthermore, a suitable upper lid member of, for example, a hardboard is placed atop the concavity in the tire-storage pan portion 2 as indicated at 6 in FIG. 2 so as to define the bottom of the luggage compartment above the spare tire T' is positioned in the pan portion 2. If a temporary-use spare tire T' is stored in the tire-storage pan portion 2 thus closed at the upper end by the lid member 6, there is a vacant space formed vertically between the lower face of the lid member 6 and the spare tire T' in the pan portion 2 as indicated at 5' in FIG. 2. If, in this instance, a luggage G having a substantial weight is placed on such a lid member 6 as indicated by dot-and-dash lines in FIG. 2, the lid member 6 would be caused to warp downwardly into the vacant space 5' in the direction as indicated by the arrow in FIG. 2. This will result in deterioration of the stability of the luggage G positioned within the luggage compartment.

All these inconveniences arising from the use of the prior-art spare-tire storage arrangement for the storage of a temporary-use spare tire could be avoided if the tire-storage pan portion 2 of the floor panel structure 1 is designed in such a manner as to fit the size of temporary-use spare tires. The spare-tire storage arrangement having the tire-storage pan portion 2 thus designed will, in turn, create an inconvenience that the tire-storage pan portion 2 can not be used for the accommodation of a spare tire of the ordinary or regular size.

The present invention contemplates provision of an improved spare-tire storage arrangement which will meet these mutually incompatible requirements of a prior-art spare-tire storage arrangement of the described basic nature.

DESCRIPTION OF THE PREFERRED EMBODIMENTS

Description will be hereinafter made regarding preferred embodiments of a spare-tire storage arrangement according to the present invention.

Figure 5:
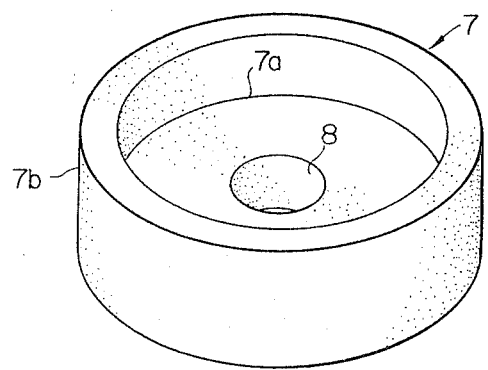
FIG. 5 is a perspective view showing a receptacle member forming part of the tire-storage arrangement shown in FIG. 4.

FIGS. 4 and 5 of the drawings shows a first preferred embodiment of a spare-tire storage arrangement according to the present invention. The spare-tire storage arrangement herein shown is basically similar to the prior-art spare-tire storage arrangement described with reference to FIGS. 1 and 2. Thus, the body structure of an automotive vehicle provided with the spare-tire storage arrangement embodying the present invention also has a floor panel structure 1 formed with a generally barrel-shaped, tire-storage pan portion 2. The tire-storage pan 2 of the floor panel structure 1 is downwardly sunk from the upper horizontal plane of the floor panel structure 1 and has formed therein a concavity which is open upwardly and which is surrounded by a generally cylindrical side wall 2a. The tire-storage pan portion 2 is internally sized to be suitable for having a spare tire T (FIG. 1) of particularly the regular size snugly or closely received on the inner peripheral surface of its side wall 2a along or at least at some points of the outer perimeter of the tread portion of the tire T and is located below, for example, the rear luggage compartment of the vehicle body. The floor panel structure 1 thus formed with a tire-storage pan portion 2 further has supported a fuel storage tank 4 which is fixedly attached to the lower face of the floor panel structure 1 and which is located, for example, in front of the tire-storage pan portion 2 as shown. The spare-tire storage arrangement embodying the present invention comprises, in addition to such a tire-storage pan portion 2 of the floor panel structure 1, an also generally drum-shaped receptacle member 7 having an annular bottom wall portion 7a formed with a central aperture 8 and a generally cylindrical side wall portion 7b as will be better seen from FIG. 5 of the drawings. The receptacle member 7 is externally sized to fit the inner peripheral surface of the side wall 2a of the tire-storage pan portion 2, viz., has an outside diameter substantially equal to or slightly smaller than the inside diameter of the side wall 2a of the tire-storage pan portion 2 as will be seen from the illustration of FIG. 4. The receptacle member 7 is in its entirety formed with a concavity defined by the bottom wall portion 7a and side wall portion 7b thereof and is internally sized to be capable of having a temporary-use spare tire T' snugly received therein as will also be seen from the illustration of FIG. 4. Thus, the receptacle member 7 has its bottom wall portion 7a sized to have a thickness which is such that the concavity formed in the receptacle member 7 has a depth substantially equal to or slightly less than the width of a temporary-use spare tire T', and its side wall portion 7b sized to have an inside diameter substantially equal to or slightly smaller than the outside diameter of the spare tire T'. The bottom wall portion 7a of the receptacle member 7 accordingly has an upper face located above the upper or inner face of the bottom wall of the tire-storage pan portion 2 at a level substantially equal to the difference between the depth of the concavity in the tire-storage pan portion 2 and the width of a temporary-use spare tire T. Furthermore, the receptacle member 7 preferably has a height substantially equal to or not larger than the depth of the concavity in the tire-store pan portion 2. The receptacle member 7 shaped and sized as above described is snugly received in the tire-storage pan portion 2 with the lower face of its bottom wall portion 7a held in close contact with the upper or inner face of the bottom wall of the tire-storage pan portion 2 and its side wall 7b held in contact with the inner peripheral surface of the side wall 2a of the pan portion 2. The receptacle member 7 is preferably constructed of an elastic material such as, for example, cellular forms of polyurethane so as to achieve a close fit particularly between the side wall 2a of the tire-storage pan portion 2 and the side wall portion 7b of the receptacle member 7.

The spare-tire storage arrangement embodying the present invention further comprises suitable clamping means 3 for holding a temporary-use spare tire T' fixedly in position within the receptacle member 7. In the spare-tire storage arrangement shown in FIG. 4, the clamping means 3 is composed of a bracket member 3a, clamping bolt 3b and a wing nut 3c. The bracket member 3a is located within the central aperture 8 in the receptacle member 7 and is securely attached to the upper or inner face of the bottom wall of the tire-storage pan portion 2. The clamping bolt 3b is secured to and extends upwardly from the bracket member 3a through the central aperture 8 in the receptacle member 7 and is engaged by the wing nut adjacent the upper end of the bolt 3b. The temporary-use spare tire T' to be housed within the tire-storage pan portion 2 is received in the concavity in the receptacle member 7 and is held in close contact with the annular upper or inner face of the bottom wall portion 7a of the receptacle member 7 along one side wall portion of the tire T' and with the inner peripheral surface of the side wall portion 7b of the receptacle member 7 along or at least at some points of the outer perimeter of the tread portion of the tire T'. The spare tire T' thus positioned within the concavity in the receptacle member 7 is securely yet detachably fixed to the bottom wall portion 7a of the receptacle member 7 with the wing nut 3c of the above mentioned clamping means 3 tightened to the wheel disc of the tire T'. A lid member 6 of, for example, a hardboard is placed on the floor panel structure 1 in such a manner as to cover the concavity in the tire-storage pan portion 2 so as to define a portion of the bottom of the luggage compartment above the tire-storage pan portion 2 as in the prior-art spare-tire storage arrangement shown in FIG. 2. The receptacle member 7 forming part of the embodiment of the arrangement above described with reference to FIGS. 4 and 5 thus is adapted to eliminate the annular gap 5 between side wall 2a of the tire-storage pan portion 2 and the temporary-use spare tire T' housed in the pan portion 2 and the unoccupied space 5' between the tire T' and the lid member 6 in the prior-art spare-tire storage arrangement shown in FIG. 2.

Figure 6:
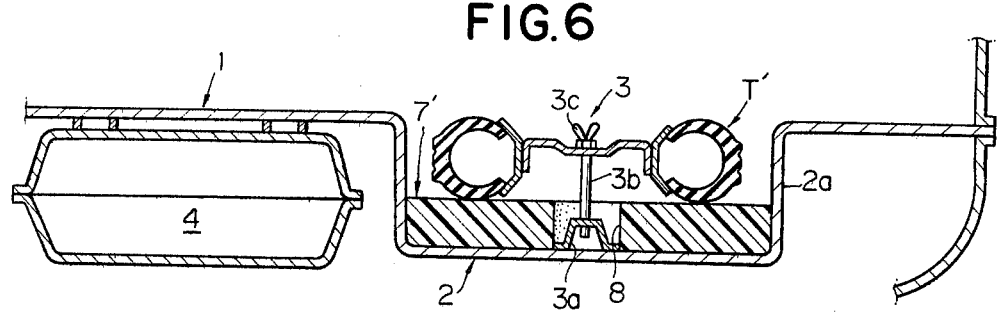
FIG. 6 is a view similar to FIG. 4 but shows a second preferred embodiment of a tire-storage arrangement according to the present invention.
Figure 7:
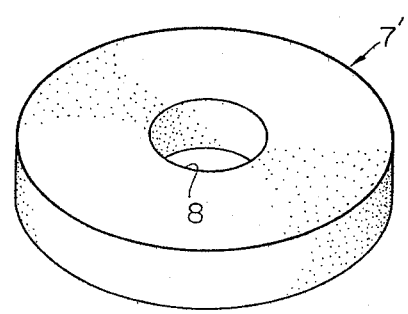
FIG. 7 is a a perspective view showing a receptacle member forming part of the tire-storage arrangement shown in FIG. 6.

FIGS. 6 and 7 of the drawings show a second preferred embodiment of a spare-tire storage arrangement according to the present invention. The spare-tire storage arrangement herein shown is a modification of the embodiment hereinbefore described with reference to FIGS. 4 and 5 and is adapted to eliminate only the vacant space 5' formed between the temporary-use spare tire T' housed in the tire-storage pan portion 2 and the lid member 6 positioned atop the concavity in the pan portion 2 as in the prior-art spare-tire storage arrangement shown in FIG. 2.

For this purpose, the spare-tire storage arrangement shown in FIG. 6 comprises, in addition to the tire-storage pan portion 2 of the floor panel structure 1 of an automotive vehicle body, a disc-shaped or an annular receptacle member 7' formed with a central aperture 8 as will be better seen from FIG. 7 of the drawings. The receptacle member 7' is externally sized to fit the inner peripheral surface of the side wall 2a of the tire-storage pan portion 2, viz., has an outside diameter substantially equal to or slightly smaller than the inside diameter of the side wall 2a of the tire-storage pan portion 2 as will be seen from FIG. 6. The receptacle member 7' further has a thickness which is substantially equal to the difference between the depth of the concavity in the tire-storage pan portion 2 and the width of a temporary-use spare tire T' as will also be seen from FIG. 6. The receptacle member 7' shaped and sized as above described is snugly received in the tire-storage pan portion 2 with the lower face thereof held in close contact with the upper or inner face of the bottom wall of the tire-storage pan portion 2 and its outer peripheral surface held in close contact with the inner peripheral surface of the side wall 2a of the pan portion 2. The receptacle member 7' is also preferably constructed of, for example, cellular foams of polyurethane. The tire-storage pan portion 2 of the floor panel structure 1 constituting the spare-tire storage arrangement including the receptacle member 7' thus arranged is per se similar to its counterpart in the embodiment of FIG. 4. The temporary-use spare tire T' to be housed within the tire-storage pan portion 2 is received on the annular upper face of the receptacle member 7' along one side wall portion of the tire T' with the tread portion of the tire T' radially spaced apart inwardly from the side wall 2a of the tire-storage pan portion 2. The spare tire T' thus positioned on the receptacle member 7' is securely yet detachably fixed to the receptacle member 7' with the clamping bolt 3b of the previously described clamping means 3 upwardly passed through the central aperture 8 in the receptacle member 7' and with the wing nut 3c of the clamping means 3 tightened to the wheel disc of the tire T'. A lid member (not shown) of, for example, a hardboard may also be placed on the floor panel structure 1 in such a manner as to cover the concavity in the tire-storage pan portion 2.

Figure 8:
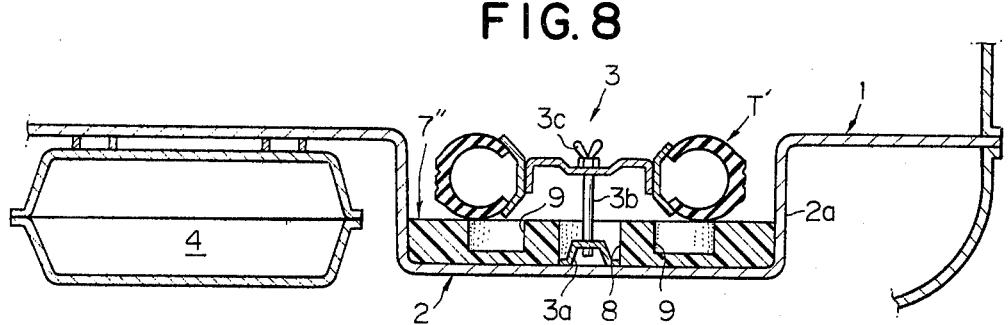
FIG. 8 is a view similar to FIG. 6 but shows a third preferred embodiment of a tire-storage arrangement according to the present invention.
Figure 9:
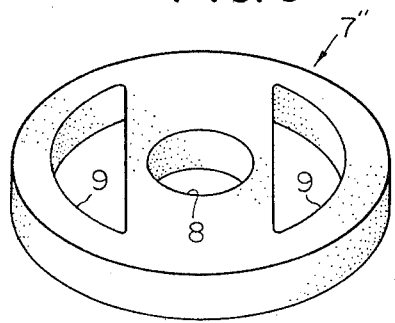
FIG. 9 is a a perspective view showing a receptacle member forming part of the tire-storage arrangement shown in FIG. 8.

FIG. 8 of the drawings shows a third preferred embodiment of a spare-tire storage arrangement according to the present invention. The spare-tire storage arrangement herein shown is a modification of the embodiment hereinbefore described with reference to FIGS. 6 and 7 and is characterized by an annular receptacle member 7" formed with a central aperture 8 as will be better seen from FIG. 9 of the drawings. The receptacle member 7" in its entirety is shaped and sized similarly to the receptacle member 7' in the spare-tire storage arrangement embodying the present invention as described with reference to FIGS. 6 and 7. The receptacle member 7" is thus also snugly received in the tire-storage pan portion 2 of the floor panel structure 1 with the lower face thereof held in close contact with the upper or inner face of the bottom wall of the tire-storage pan portion 2 and its outer peripheral surface held in contact with the inner peripheral surface of the side wall 2a of the pan portion 2. In the spare-tire storage arrangement shown in FIG. 8, the receptacle member 7" is formed not only with the central aperture 8 but a suitable number of concavities 9 which are open upwardly as will be clearly seen from the illustration of FIG. 9. The concavities 9 thus formed in the receptacle member 7" are intended to serve as spaces to accommodate therein some repair tools (not shown) or the like to be used when, for example, the spare tire T' stored in the tire-storage pan portion 2 is to be exchanged with one of the tires in use on the vehicle. The concavities 9 formed in the receptacle member 7" as described above are shown provided as being two in number and each having a generally crescent-shaped cross section. Such arrangement of the concavities 9 in the receptacle member 7" of the embodiment shown in FIG. 7 is, however, merely for the purpose of illustration and may be changed and/or modified as desired.

From the foregoing description it will have been appreciated that a spare-tire storage arrangement according to the present invention provides the following advantages.

(1) Since the temporary-use spare tire T' housed in the tire-storage pan portion 2 of the floor panel structure 1 is positioned on the bottom wall portion 7a of the receptacle member 7 (FIGS. 4 and 5) or the receptacle member 7' (FIGS. 6 and 7) or the receptacle member 7" (FIGS. 8 and 9), the spare tire T' has its upper end located at a level substantially flush with the upper face of the floor panel structure 1. When the lid member 6 is placed on the floor panel structure 1 in such a manner as to cover the concavity in the tire-storage pan portion 2, there is no occupied space formed between the spare tire T' and the lid member 6. When a luggage G is placed on the lid member 6 as indicated by dot-and-dash lines in FIG. 4, the weight of the luggage G is borne by the spare tire T' housed in the tire-storage pan portion 2 by means of the receptacle member 7, the receptacle member 7' or the receptacle member 7" so that the lid member 6 is prevented from being caused to warp downwardly into the concavity in the tire-storage pan portion 2.

(2) In the absence of an annular gap between the side wall 2a of the tire-storage pan portion 2 of the floor panel structure 1 and the temporary-use spare tire T' accommodated within the tire-storage pan portion 2 by means of the receptacle member 7 as in the first preferred embodiment of the spare-tire storage arrangement shown in FIG. 4, the spare tire T' is constrained from being flung forward or otherwise dislodged from its initial position in the tire-storage pan portion 2. When the spare tire T' is forced to move with respect to the tire-storage pan portion 2 as in the event the vehicle encounters a forward collision at the rear end thereof, the tire-storage pan portion 2 is prevented from being deformed toward the fuel storage tank 4 and accordingly from striking against the fuel storage tank 4. The fuel storage tank 4 positioned in front of or otherwise in the vicinity of the tire-storage pan portion 2 of the floor panel structure 1 is therefore protected from being broken by the tire-storage pan portion 2 during a collision encountered by the vehicle.

What is claimed is:

1. A spare-tire storage arrangement of an automotive vehicle having a vehicle body including a floor panel structure having a substantially horizontal upper face, comprising
    a tire-storage pan portion forming part of the floor panel structure and downwardly sunk from the horizontal upper face of the floor panel structure, the tire-storage pan portion having a bottom wall and a side wall and being formed with a concavity which is open upwardly and which is surrounded by the side wall, the tire-storage pan portion is being internally sized to be suitable for having a regular-sized spare tire snugly received on the inner surface of said side wall at least at a plurality of points of the outer perimeter of the tread portion of the tire;
    a receptacle member externally sized to fit the inner surface of the side wall of the tire-storage pan portion, the receptacle member having an upper face located above the upper face of the bottom wall of the tire-storage pan portion at a level substantially equal to the difference between the depth of the concavity in the tire-storage pan portion and the width of a temporary-use spare tire; and
    clamping means for having a temporary-use spare tire securely yet detachably attached to the upper face of the receptacle member.

2. A spare-tire storage arrangement as set forth in claim 1, in which said receptacle member has a bottom wall portion closely received on the upper face of the bottom wall of said tire-storage pan portion and a side wall portion externally sized to snugly fit the inner surface of the side wall of the tire-storage pan portion and internally sized to have a temporary-use spare tire snugly received on the inner surface of the side wall portion at least at a plurality of points of the outer perimeter of the temporary-use spare tire, the receptacle member being formed with a concavity defined by the respective inner surfaces of said bottom wall portion and said side wall portion and having a depth which is substantially equal to the width of a temporary-use spare tire.

3. A spare-tire storage arrangement as set forth in claim 2, in which each of said tire-storage pan portion and said receptacle member has a substantially circular cross section, wherein the side wall of the tire-storage pan portion has an inside diameter substantially equal to the outside diameter of a regular-sized spare tire and wherein the side wall portion of the receptacle member has an outside diameter substantially equal to the inside diameter of the side wall of the tire-storage pan portion and an inside diameter substantially equal to the outside diameter of a temporary-use spare tire.

4. A spare-tire storage arrangement as set forth in claim 1, in which said receptacle member as a whole has a thickness substantially equal to the difference between the depth of the concavity in said tire-storage pan portion and the width of a temporary-use spare tire.

5. A spare-tire storage arrangement as set forth in claim 4, in which each of said tire-storage pan portion and said receptacle member has a substantially circular cross section, wherein the side wall of the tire-storage pan portion has an inside diameter substantially equal to the outside diameter of a regular-sized spare tire and wherein the receptacle member has an outside diameter substantially equal to the inside diameter of the side wall of the tire-storage pan portion.

6. A spare-tire storage arrangement as set forth in any one of claims 1 to 5, in which said receptacle member is formed with an aperture through which said clamping means is operative to have a temporary-use spare tire securely yet detachably attached to said receptacle member and to have the receptacle member securely attached to the bottom wall of said tire-storage pan portion.

7. A spare-tire storage arrangement as set forth in any one of claims 1 to 5, in which said receptacle member is formed with at leaast one upwardly open concavity for having a tool accommodated therein.

8. A spare-tire storage arrangement as set forth in any one of claims 1 to 5, in which said receptacle member in its entirety has a height not larger than the depth of the concavity in the tire-storage pan portion.

9. A spare-tire storage arrangement as set forth in any one of claims 1 to 5, further comprising a lid member placed on the floor panel structure in such a manner as to cover the concavity in said tire-storage pan portion.

* * * * *